United States Patent [19]

Rager et al.

[11] Patent Number: 5,363,447
[45] Date of Patent: Nov. 8, 1994

[54] METHOD FOR LOADING ENCRYPTION KEYS INTO SECURE TRANSMISSION DEVICES

[75] Inventors: Kent D. Rager; Steven H. Lay, both of Elgin, Ill.

[73] Assignee: Motorola, Inc., Schaumburg, Ill.

[21] Appl. No.: 37,950

[22] Filed: Mar. 26, 1993

[51] Int. Cl.⁵ ............................................. H04L 9/08
[52] U.S. Cl. ........................................ 380/21; 380/50
[58] Field of Search ................... 380/21, 50, 52, 45, 380/47

[56] References Cited

U.S. PATENT DOCUMENTS

| | | | |
|---|---|---|---|
| 4,369,332 | 1/1983 | Campbell, Jr. | 380/52 |
| 5,093,860 | 3/1992 | Steinbrenner et al. | 380/50 |
| 5,146,497 | 9/1992 | Bright | 380/21 |
| 5,161,189 | 11/1992 | Bray et al. | 380/21 |
| 5,164,986 | 11/1992 | Bright | 380/21 |
| 5,241,597 | 8/1993 | Bright | 380/21 |
| 5,247,576 | 9/1993 | Bright | 380/21 |
| 5,249,227 | 9/1993 | Bergum et al. | 380/50 |

Primary Examiner—Salvatore Cangialosi
Attorney, Agent, or Firm—Timothy W. Markison

[57] ABSTRACT

An encryption code and at least one key are provided to a secure transmission device, via an external keying device, and stored in a first volatile memory. An encrypted representation of the at least one key, based on the encryption code and the at least one key, is generated and stored in a non-volatile memory. Upon power down of the secure transmission device, the encryption code is stored in a second volatile memory and the at least one key and encryption code stored in the first volatile memory are erased.

16 Claims, 2 Drawing Sheets

METHOD FOR LOADING ENCRYPTION KEYS INTO SECURE TRANSMISSION DEVICES

FIELD OF THE INVENTION

The present invention relates generally to secure communications systems and, in particular, to a method of loading encryption keys into secure transmission devices.

BACKGROUND OF THE INVENTION

Communication systems are known to comprise mobile transmitters and receivers, such as in-car mobile or hand-held portable radios (mobiles), as well as fixed transmitters and fixed receivers, such as base stations or repeaters (fixed end). The mobiles and fixed end are operably coupled by separate transmit and receive communication paths. The communication paths between the mobiles and the fixed end are typically wireless links, such as radio frequency (RF) channels. The communication paths between fixed transmitters and receivers are typically wireline links, such as land-based phone lines.

A typical message within such a communication system may begin with a mobile unit converting an audio signal into a digital data stream suitable for transmission over an RF channel to either another mobile unit or the fixed end. Such systems are often used by public safety institutions, such as local or federal law enforcement agencies. The existence of commercially available RF scanners make it possible for unauthorized parties to monitor the information transmitted within such a communication system. In efforts to reduce unauthorized eavesdropping, communication systems use digital encryption methods that protect proprietary information transmitted therein.

Digital encryption methods use a known, reversible algorithm to introduce randomness into a digital data stream. To an unauthorized user, an encrypted digital data stream will appear random, and thus unintelligible. Such an algorithm that randomizes digital data is called an encryptor. By necessity, the same algorithm which is capable of encrypting the digital data stream must also be capable of recovering the digital data stream, and hence, is called a decryptor. Often, an encryptor/decryptor algorithm utilizes a dynamic parameter, hereafter referred to as a key, to uniquely specify the nature of the randomness introduced to the digital data stream. Thus, only encryptors and decryptors utilizing an identical algorithm and key are capable of reproducing intelligible messages. Obviously, the security of keys in systems utilizing encryption is of the utmost importance in the prevention of unauthorized monitoring. If the keys of a known encryptor/decryptor algorithm are made available, the ability of unauthorized parties to monitor proprietary communications is greatly enhanced.

Typically, the keys used by secure transmission devices, such as mobiles or fixed-ends, are stored in a volatile memory device such as RAM (Random Access Memory). This method of storage allows the transmission device to quickly access keys, as might be required for a feature such as encrypted mode channel scanning. Also, the use of a volatile memory allows the key information to be erased in the event that the transmission device is tampered with or powered down, thus maintaining security. For instance, if a transmission device is tampered with or the volatile memory is powered down (through the loss of battery backup, for instance), the information stored in volatile memory is passively erased. Passive erasure typically implies allowing the information stored in volatile memory to decay away with the loss of power. When the transmission device is subsequently powered up, however, an external device is typically required to reload the keys. This requirement can prove to be a nuisance in transmission devices in which power is frequently cycled, such as hand-held portable radios.

Thus, a need exists for a method which allows encryption keys to be stored without risk of unauthorized access and without the need for external key reloading when the device is repowered.

DESCRIPTION OF A PREFERRED EMBODIMENT

Generally, the present invention provides a method for loading and utilizing a key within a secure transmission device. The key is initially loaded into the secure transmission device by connecting an external keying device and initiating a keyload. The keying device transfers one or more keys and a random number (encryption code) to the secure transmission device, which are stored in a first volatile memory, such as RAM. An encryption device within the secure transmission device uses the encryption code to produce encrypted representations of the keys which are stored in EEPROM (Electrically Erasable Programmable Read Only Memory).

Once a key has been loaded, the secure transmission device uses the encryption code, via the encryption device, to decrypt and thus recapture the keys stored in EEPROM. The recaptured keys, which are stored in RAM, may thereafter be used for encrypting and decrypting data while the secure transmission device engages in secure communications. Prior to powering down the secure transmission device, the encryption code, in the form of a master key, is stored in a second volatile memory and the encryption code and recaptured keys are erased from RAM.

Figure 1:
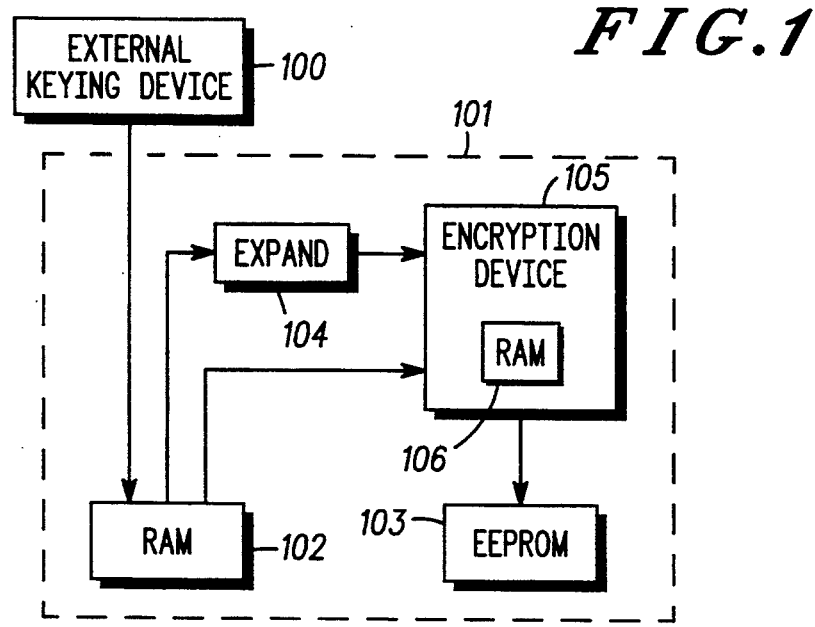
FIG. 1 illustrates an external keying device coupled to a secure transmission device in accordance with the present invention.

The present invention can be more fully described with reference to FIGS. 1-3. FIG. 1 illustrates a secure transmission device 101 coupled to an external keying device 100. It is important to note that the secure transmission device 101 may also be referred to as a secure communication unit and may comprise, for example, a Motorola ASTRO digital radio. The external keying device 100 may comprise a Motorola ASTRO and Advanced Securenet Key Variable Loaders (KVL). The secure transmission device 101 comprises a first volatile memory (RAM) 102, a non-volatile memory (EEPROM) 103, an expander 104 for expanding the encryption code into a key variable, and an encryption device 105 containing a second volatile memory (RAM) 106. The second volatile memory 106 may comprise a memory device that can be written to by devices external to the encryption device 105 but that may only be read by the encryption device 105. Furthermore, the second volatile memory 106 may comprise a static RAM with reset logic, wherein the reset logic allows the second volatile memory 106 to be immediately erased upon command via a signal external to the encryption device 105. The encryption device 105 may comprise a Motorola Data Encryption Standard (DES), Digital Voice International (DVI-XL), or Digital Voice Protection (DVP-XL) encryption device.

The external keying device 100 provides two pieces of information to the secure transmission device 101: an encryption code and at least one key. The KVL transmits a random 64-bit value, referred to as the encryption code, to the secure transmission device 101. The secure transmission device 101 further randomizes the encryption code by reading a 16-bit free-running counter upon reception of the encryption code. This 16-bit value is exclusive-OR'd with 16 bits of the encryption code. The resulting value of this operation is loaded into a maximal length linear feedback shift register (LFSR), as is well known in the art, and shifted 64 times to "spread out" the randomizing effect of the exclusive-OR operation. The resulting 64-bit value left in the LFSR is the encryption code stored in the first volatile memory 102.

In order to encrypt/decrypt any type of data, the encryption device 105 requires a key variable. As discussed above, such a key may come directly from a KVL. In a preferred embodiment, the encryption code may also be used to derive a key suitable for use in the encryption device 105. To this end, the expander 104 is used to expand the 64-bit, random encryption code into a key variable for use in the encryption device 105. Note that the secure transmission device 101 could contain more than one encryption device. Thus, when encrypting keys, it is recommended that the most secure encryption device available is used such that keys for a given algorithm are not encrypted by a less-secure encryption device. To this end, the expander 104 determines what encryption devices are available and chooses the most secure one based on a fixed ranking. In a preferred embodiment, DES is ranked as the most secure, followed by DVI-XL and DVP-XL, respectively.

After choosing the encryption device 105, the expander 104 formats the encryption code into a key for the chosen encryption device 105. In a preferred embodiment, the expansion process comprises modifying the encryption code for correct parity (for DES encryption devices), or concatenating the encryption code with a fixed value and appending a cyclical redundancy check (CRC), as are known in the art, calculated over the concatenated value, to the end of the concatenated value (for DVI-XL and DVP-XL encryption devices).

In a preferred embodiment, the encryption device 105 is used for the encryption and decryption of multiple data types, including the encryption code, keys, and message information to be transmitted and received. In all cases, the encryption or decryption is performed by using the encryption device 105 to generate a pseudorandom bit string, referred to as a keystream. First, a maximal length linear feedback shift register (LFSR), as is well known in the art, is used to generate a pseudorandom bit string which is placed on the cipher text input (CTI) of the encryption device 105. The encryption device 105 modifies the pseudo-random bit string received via the CTI based on the key stored in the second volatile memory 106. The modified or "decrypted" bit string is then placed on the plain text output (PTO) of the encryption device 105. The data recovered from the PTO is the keystream. The keystream is then exclusive-OR'd with unencrypted data to generate encrypted data or with encrypted data to generate decrypted data.

The non-volatile memory 103, which may comprise an EEPROM, is used to store encrypted representations of the encryption code and key (or keys). These encrypted representations can remain in the non-volatile memory 103 whether the secure transmission device 101 is powered up or down. The first volatile memory 102, which may comprise a RAM, is used to store the decrypted encryption code and decrypted keys only while the secure transmission device 101 is powered up. The encryption code, in the form of a master key produced by the expander 104, is stored in the second volatile memory 106 of the encryption device 105 when the secure transmission device 101 is powered down. Since the second volatile memory 106 cannot be read by devices external to the encryption device 105, the encrypted representation of the encryption code is stored in the non-volatile memory 103 so that the encryption code may be recaptured by decrypting the encrypted representation of the encryption code at subsequent power ups. During the course of secure transmissions, keys are loaded into the second volatile memory 106 of the encryption device 105 for use in the encryption and decryption of message information being transmitted and received. Prior to power down, the decrypted encryption code stored in the first volatile memory 102 is expanded into a master key by the expander 104 and stored into the second volatile memory 106. Finally, the decrypted encryption code and keys stored in the first volatile memory 102 are erased.

To maintain security while the secure transmission device 101 is powered down, a constant voltage is supplied to the encryption device 105, and consequently the second volatile memory 106. As stated previously, the second volatile memory 106 has a reset line which, in a preferred embodiment, is connected to a tamper detection circuit in the secure transmission device 101. If the tamper detection circuit activates the reset line to the second volatile memory 106, the master key formed by expanding the encryption code will be erased, thereby preventing the encrypted representations of the encryption code and key variables from being decrypted at the next power up.

Figure 2:
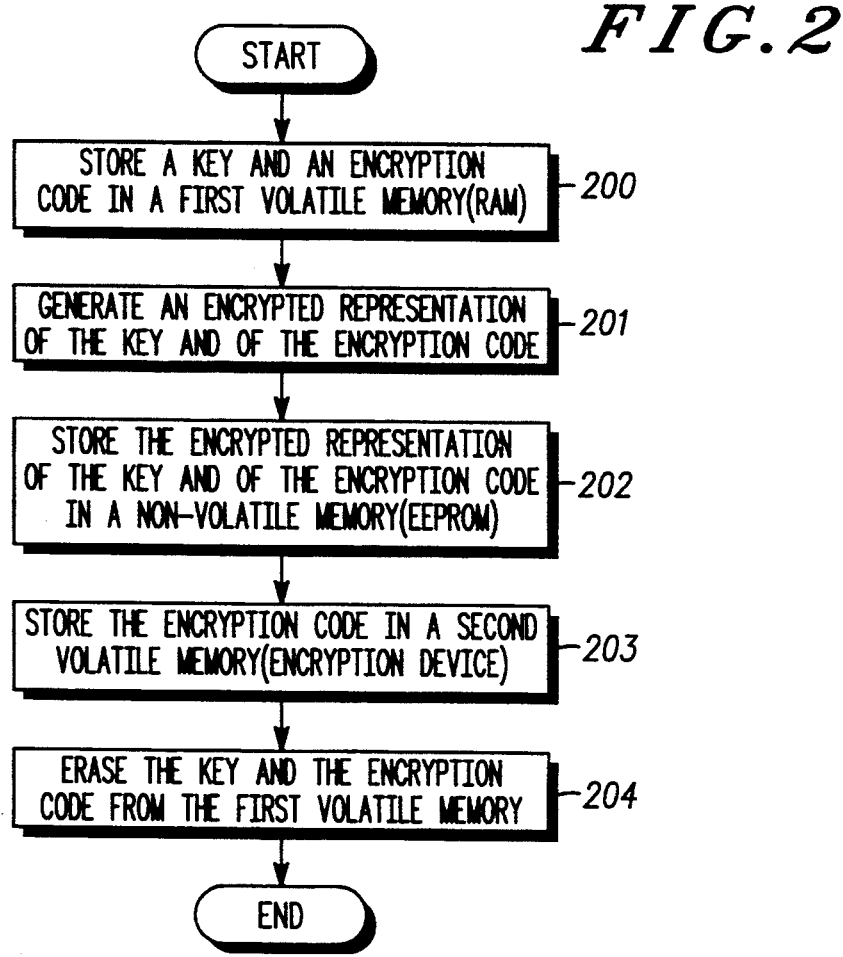
FIG. 2 illustrates a logic diagram that a secure transmission device could implement to load a key in accordance with the present invention.

FIG. 2 illustrates a logic diagram that the secure transmission device 101 could use to load a key in accordance with the present invention. At step 200, the external keying device 100 transmits an encryption code and key to the secure transmission device 101. If the secure transmission device 101 is currently not storing any keys, the encryption code and key are stored in the first volatile memory 102. It is understood that more than one key can be loaded from the KVL. Upon storing the encryption code, a 16-bit CCITT (Consultative Committee on Telephony and Telegraphy) standard CRC, hereafter referred to as an encryption check code, is calculated over the encryption code and stored along with the encryption code in the first volatile memory 102.

At step 201, the encrypted representation of the encryption code is generated. This is done by expanding the encryption code with the expander 104 and loading the resulting key into the RAM 106 of the encryption device 105. A maximal length linear feedback shift register (LFSR) is then loaded with a fixed, 64-bit value. While the precise pattern of the 64-bit value is arbitrary, the same value must be used each time this process is repeated. The LFSR, starting from this value, produces a pseudo-random bit string as it is shifted. A fixed amount of data generated by the LFSR is sent to the encryption device 105, causing the encryption device 105 to synchronize. With the encryption device 105 synchronized, more data generated by the LFSR is sent to the encryption device 105 to produce a keystream as previously discussed. The keystream is then exclusive-OR'd with the encryption code and the encryption check code stored in the first volatile memory 102 to produce encrypted representations of the encryption code and of the encryption check code, which are then stored 202 in the non-volatile memory 103.

In a preferred embodiment, the secure transmission device 101 is capable of storing up to 18 key variables. There exist 18 slots in non-volatile memory 103 and 18 slots in first volatile memory 102 for the storage of these keys. After receiving at least one key variable, the secure transmission device 101 generates a keystream and stores it in at least one of the 18 slots in first volatile memory 102. This keystream is generated based on the key formed from the expansion of the encryption code, which, at this point, is still loaded in the encryption device 105. As before, the LFSR is loaded with a fixed value, the encryption device 105 is synchronized, and enough keystream is generated to completely fill the at least one slots in first volatile memory 102.

Each byte of the received key is exclusive-OR'd with its respective byte of keystream to form the encrypted representation of the key variable. The encrypted representation of the key is stored 202 in the appropriate slot in the non-volatile memory 103. In a preferred embodiment, appropriate slots in the non-volatile memory 103 and the first volatile memory 102 are determined by slot indicators transmitted by the external keying device 100 along with the keys. The key is then stored in place of the keystream in the appropriate slot of first volatile memory 102. This process is repeated for each key sent to the secure transmission device 101.

The encryption code sent to the secure transmission device 101 by the external keying device 100 is only used when the secure transmission device 101 currently contains no key variables in any of the 18 slots. If one or more keys already exist in any of the 18 slots, the encryption code is ignored. In this case, the encryption code used when the existing keys were loaded is used again. Furthermore, if the external keying device 100 attempts to store a key in a slot already occupied, the secure transmission device 101 first recovers the keystream for that slot by exclusive-OR'ing the key already stored in that slot of first volatile memory 102 with its encrypted representation stored in the corresponding slot of non-volatile memory 103. The recovered keystream is exclusive-OR'd with the new key to produce the encrypted representation of the new key. The encrypted representation of the new key is then stored in its appropriate slot of non-volatile memory 103. Finally, the new key is stored in place of the recovered keystream in its appropriate slot of first volatile memory 102.

In the event of a power down, the encryption code currently stored in first volatile memory 102 is stored 203, in the form of a master key after expansion by the expander 104, in the second volatile memory 106 of the encryption device 105. The encryption code, keys and keystream (in empty slots) are then erased 204 from the first volatile memory 102. Thus, the only piece of sensitive information (the master key formed from the encryption code) within the secure transmission device 101 is stored in the second volatile memory 106 of the encryption device 105 which, as discussed previously, is protected by tamper detection hardware.

Figure 3:
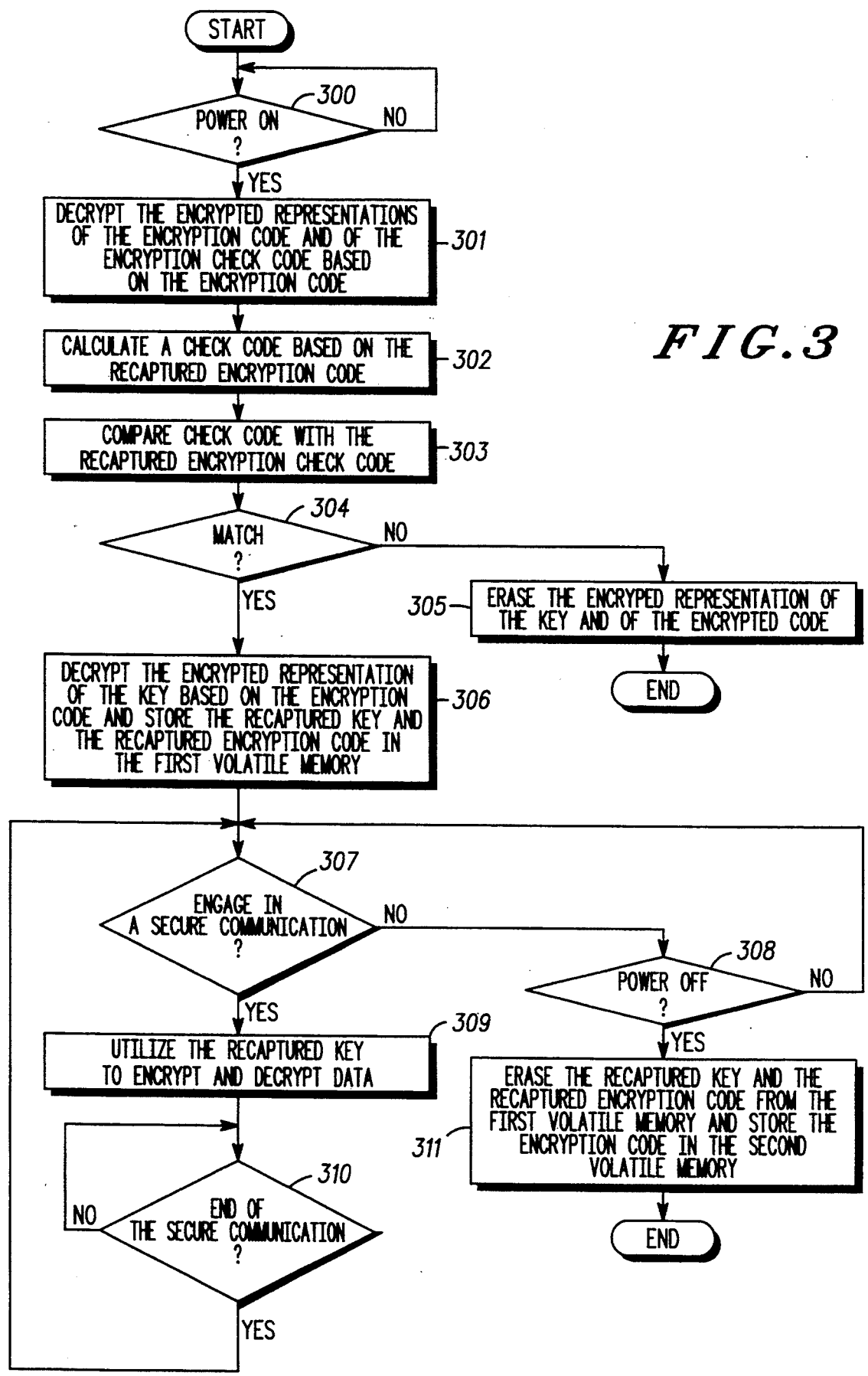
FIG. 3 illustrate a logic diagram that a secure transmission device could implement to utilize a key in accordance with the present invention.

FIG. 3 illustrates a logic diagram which can be implemented to utilize encrypted representations of keys stored within the secure transmission device 101. It is assumed at this point that encrypted representations of the encryption code, encryption check code, and at least one key are stored in the non-volatile memory 103. Upon power up 300, the secure transmission device 101 attempts to decrypt 301 the encrypted representation of the encryption code and the encrypted representation of the encryption check code stored in non-volatile memory 103. If no tampering or loss of power to the encryption device 105 has taken place, the master key derived from the encryption code is stored in the encryption device 105. The encrypted representations of the encryption code and encryption check code are obtained by using the encryption device 105 to generate keystream in the same manner as when the encrypted representations were originally formed. As before, the LFSR is loaded with a fixed value, the encryption device 105 is synchronized, and keystream is generated. The resultant keystream is then exclusive-OR'd with the encrypted representations of the encryption code and encryption check code to produce a recaptured encryption code and a recaptured encryption check code.

In order to verify the integrity of the master key stored in the second volatile memory 106, a check code is calculated 302, in the same manner as the original encryption check code, over the recaptured encryption code. The check code is compared 303 to the recaptured encryption check code. If the check code and the recaptured encryption check code match 304, the recaptured encryption code is assumed to have been decrypted correctly, and hence, the master key stored in the second volatile memory 106 is assumed to be valid. If the secure transmission device 101 had been tampered with while the power was off, the tamper detect hardware would have caused the master key stored in the second volatile memory 106 to be erased. If the master key was erased, the encrypted representation of the encryption code cannot be decrypted correctly and the secure transmission device 101 is assumed to have been tampered with. It is important to note that the master key stored in the second volatile memory 106 cannot be read by devices external to the encryption device 105. Therefore, the recaptured encryption code is stored 306 in the first volatile memory 102 for later re-storage into the second volatile memory 106, in the form of a master key, at the next power down. This is done because the second volatile memory 106 is loaded with other keys, hence destroying the master key, when the secure transmission device 101 engages in secure communications.

If the check code and the recaptured encryption check code do not match 304, the encrypted representations of the encryption code and key variables are erased 305 from non-volatile memory 103. As discussed above, the check code and the recaptured encryption check code may not match as a result of a tamper attempt with the secure transmission device 101. At this point, an external keying device 100 must be connected to the secure transmission device 101 and new keys loaded, as described above, in order to use the secure transmission device 101 again.

If the check code matches the recaptured encryption check code 304, the encrypted representations of the keys, stored in non-volatile memory 103, are decrypted and stored 306 in the first volatile memory 102. The decryption of the encrypted representations of the keys is accomplished as described above. As before, the LFSR is loaded with a fixed value, the encryption device 105 is synchronized, and keystream is generated. The keystream is stored in all the first volatile memory 102 key slots and each key slot of non-volatile memory 103 is checked for the presence of an encrypted representation of a key. If no encrypted representation of a key is present in a given key slot of non-volatile memory 103, the keystream is left in the corresponding key slot of the first volatile memory 102. If an encrypted representation of a key is present in non-volatile memory 103, each byte of keystream stored in the corresponding key slot of first volatile memory 102 is exclusive-OR'd with the corresponding byte of the encrypted representation of the key variable stored in non-volatile memory 103, resulting in a recaptured key. The recaptured key variable is then stored in place of the keystream in its corresponding slot of first volatile memory 102. This process is repeated for all of the key slots.

Having stored all possible recaptured keys into their corresponding slots in first volatile memory 102, it is determined 307 if a secure communication is to take place. If a secure transmission is to occur, a recaptured key in one of the 18 key slots of first volatile memory 102 is loaded into the second volatile memory 106 of the encryption device 105. The encryption device 105 is then used 309 for the encryption and decryption of transmitted and received information.

Upon detecting the end of the current secure communication 310, it is determined 307 that a secure communication is no longer taking place. If power has not been removed 308, the secure transmission device 101 continues to await a secure communication 307.

If, however, power has been removed 308, the encryption code stored in first volatile memory 102 is expanded into a master key by the expander 104 and loaded into the second volatile memory 106 of the encryption device 105, as shown at step 311. After loading the master key into the encryption device 105, the encryption code and all 18 key variables (or keystream if a key is not present in a given slot) are erased 311 from the first volatile memory 102. Thus, the only unencrypted information remaining within the secure transmission device 101 is the master key loaded in second volatile memory 106. Because the master key is protected by tamper detection hardware, all of the encrypted representations of keys stored in the non-volatile memory 103 are also protected with tamper detection. This results from the fact that the master key is required to recover any of the keys.

The present invention provides a way for encryption keys, actively erased from RAM at power down, to be recovered on subsequent power ups without compromising the security of the communication unit in which they are contained and without requiring an external keying device to load the keys. By leaving only encrypted representations of the keys in EEPROM and the master key necessary to decrypt them in a tamper-protected RAM device, keys can be decrypted and recovered when necessary. If the communication unit is tampered with, the master key is actively erased immediately, thus rendering the encrypted representations of the keys useless.

We claim:

1. A method for loading a key into a secure transmission device, the method comprises the steps of:
   a) storing the key and an encryption code in a first volatile memory, wherein the key and the encryption code are sourced by an external keying device;
   b) generating, by an encryption device, an encrypted representation of the key based on the key and the encryption code;
   c) storing the encrypted representation of the key in non-volatile memory;
   d) storing the encryption code in a second volatile memory; and
   e) erasing the key and the encryption code from the first volatile memory.

2. In the method of claim 1, step (a) further comprises storing multiple keys in the first volatile memory.

3. In the method of claim 1, the second volatile memory is a portion of the encryption device.

4. In the method of claim 1, step (e) further comprises removing power from the first volatile memory.

5. The method of claim 1 further comprises storing an encrypted representation of the encryption code in the non-volatile memory.

6. In the method of claim 2, step (a) further comprises storing multiple encryption codes in the first volatile memory.

7. A method for loading a key into a secure transmission device, the method comprises the steps of:
   a) storing the key and an encryption code in a first volatile memory, wherein the key and the encryption code are sourced by an external keying device;
   b) generating an encryption check code based on the encryption code;
   c) storing the encryption check code in the first volatile memory;
   d) generating a master key based on the encryption code;
   e) generating, by an encryption device, an encrypted representation of the key based on the key and the master key;
   f) storing the encrypted representation of the key in non-volatile memory;
   g) storing the master key in a second volatile memory; and
   h) erasing the key, the encryption code, and the encryption check code from the first volatile memory.

8. A method for a secure transmission device to utilize a key to transmit secure data, wherein an encrypted representation of the key, an encrypted representation of an encryption code and an encrypted representation of an encryption check code are stored in a non-volatile memory, the method comprises the steps of:
   a) decrypting, by an encryption device, the encrypted representation of the encryption code and the encrypted representation of the encryption check code based on a master key, to produce a recaptured encryption code and a recaptured encryption check code, wherein the master key is stored in a second volatile memory;
   b) calculating a check code based on the recaptured encryption code;

c) comparing the recaptured encryption check code and the check code;

d) when the recaptured encryption check code and the check code substantially match, decrypting, by the encryption device, the encrypted representation of the key based on the master key to produce a recaptured key;

e) storing the recaptured key in a first volatile memory;

f) when the secure transmission device engages in secure communications, utilizing the recaptured key to encrypt and decrypt transmitted data; and g) when the secure transmission device is disabled, erasing the recaptured key from the first volatile memory.

9. In the method of claim 8, step (e) further comprises storing the recaptured encryption code and the recaptured encryption check code in the first volatile memory.

10. In the method of claim 8, wherein the second volatile memory is a portion of the encryption device, step (f) further comprises utilizing the second volatile memory to encrypt and decrypt transmitted data such that the master key is lost.

11. In the method of claim 10, step (g) further comprises storing the master key, based on the recaptured encryption code, in the second volatile memory.

12. In the method of claim 8, when the recaptured encryption check code and the check code do not match, step (d) further comprises erasing the encrypted representation of the key and the encrypted representation of the encryption code from the non-volatile memory.

13. A method for a secure transmission device to utilize a key to transmit secure data, wherein an encrypted representation of the key, an encrypted representation of an encryption code and an encrypted representation of an encryption check code are stored in a non-volatile memory, the method comprises the steps of:

a) decrypting, by an encryption device, the encrypted representation of the encryption code and the encrypted representation of the encryption check code based on a master key to produce a recaptured encryption code and a recaptured encryption check code, wherein the master key is stored in a second volatile memory;

b) calculating an encryption check code based on the recaptured encryption code;

c) comparing the encryption check code and the recaptured encryption check code;

d) when the encryption check code and the recaptured encryption check code substantially match, decrypting, by the encryption device, the encrypted representation of the key based on the master key to produce a recaptured key;

e) storing the recaptured key in a first volatile memory;

f) when the secure transmission device engages in secure communications, utilizing the recaptured key to encrypt and decrypt transmitted data; and g) when the secure transmission device is disabled, erasing the recaptured key from the first volatile memory.

14. In the method of claim 13, step (e) further comprises storing the recaptured encryption code and the recaptured encryption check code in the first volatile memory.

15. In the method of claim 13, wherein the second volatile memory is a portion of the encryption device, step (f) further comprises utilizing the second volatile memory to encrypt and decrypt transmitted data such that the master key is lost.

16. The method of claim 15 further comprises storing the recaptured encryption code in the second volatile memory.

* * * * *